United States Patent
Conchouso Gonzalez et al.

(10) Patent No.: US 10,792,638 B2
(45) Date of Patent: Oct. 6, 2020

(54) MICROFLUIDIC DROPLET GENERATOR WITH CONTROLLED BREAK-UP MECHANISM

(71) Applicant: KING ABDULLAH UNIVERSITY OF SCIENCE AND TECHNOLOGY, Thuwal (SA)

(72) Inventors: David Conchouso Gonzalez, Thuwal (SA); Armando Arpys Arevalo Carreno, Cheshire (GB); Ian G. Foulds, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 304 days.

(21) Appl. No.: 15/763,618

(22) PCT Filed: Oct. 7, 2016

(86) PCT No.: PCT/IB2016/056032
§ 371 (c)(1),
(2) Date: Mar. 27, 2018

(87) PCT Pub. No.: WO2017/060876
PCT Pub. Date: Apr. 13, 2017

(65) Prior Publication Data
US 2018/0280911 A1    Oct. 4, 2018

Related U.S. Application Data

(60) Provisional application No. 62/239,562, filed on Oct. 9, 2015.

(51) Int. Cl.
*B01L 3/00* (2006.01)
*B01L 3/02* (2006.01)
(Continued)

(52) U.S. Cl.
CPC ............. *B01J 13/08* (2013.01); *B01F 3/0807* (2013.01); *B01F 13/0062* (2013.01);
(Continued)

(58) Field of Classification Search
CPC  B01F 13/0062; B01F 13/1022; B01F 3/0807; B01J 13/08; B01L 2300/088;
(Continued)

(56) References Cited

U.S. PATENT DOCUMENTS

2010/0137163 A1* 6/2010 Link ................... B01F 13/0071
506/16
2014/0024023 A1* 1/2014 Cauley, III ........ B01L 3/502784
435/6.1

(Continued)

FOREIGN PATENT DOCUMENTS

| FR | 2946895 A1 | 12/2010 |
| WO | 2007081387 A1 | 7/2007 |
| WO | 2011028764 A2 | 3/2011 |

OTHER PUBLICATIONS

Communication pursuant to Article (94(3) in related/corresponding European Application No. 16784576.7, dated Feb. 15, 2019 (Documents D1-D4 were cited in the IDS filed Mar. 27, 2018).
(Continued)

*Primary Examiner* — Jennifer Wecker
(74) *Attorney, Agent, or Firm* — Patent Portfolio Builders PLLC

(57) ABSTRACT

Droplet generation devices and systems that parallelize droplet generation devices are provided. The droplet generation devices can include a symmetric block-and-break system and a tapered droplet generation zone. The symmetric block-and-break system can include a pair of break channels and a pair of bypass channels symmetrically arranged with respect to the dispersed-phase input channel
(Continued)

and the output channel. The droplet generation devices can generate monodisperse droplets with a predefined volume over a range of flow rates, pressures, and fluid properties. The droplet generation devices are therefore capable of parallelization to achieve large-capacity droplet generation, e.g. greater than 1 L/hr, with small overall coefficients of variation.

20 Claims, 6 Drawing Sheets

(51) Int. Cl.
*B01J 13/08* (2006.01)
*B01F 13/00* (2006.01)
*B01F 13/10* (2006.01)
*B01F 3/08* (2006.01)

(52) U.S. Cl.
CPC ........ *B01F 13/1022* (2013.01); *B01L 3/0241* (2013.01); *B01L 3/502746* (2013.01); *B01L 3/502784* (2013.01); *B01L 2300/088* (2013.01); *B01L 2400/086* (2013.01)

(58) Field of Classification Search
CPC ............. B01L 2400/086; B01L 3/0241; B01L 3/502746; B01L 3/502784
See application file for complete search history.

(56) References Cited

U.S. PATENT DOCUMENTS

2014/0312534 A1* 10/2014 Cauley, III .......... B29C 33/3835
264/400
2016/0271610 A1* 9/2016 Foulds .................. B01F 3/0807

OTHER PUBLICATIONS

Carroll, N. J., et al.; "Droplet Microreactors for Materials Synthesis"; Microdroplet Technology: Principles and Emerging Applications in Biology and Chemistry; Jan. 2012; pp. 179-209.
Chan, E., et al.; "High-Temperature Microfluidic Synthesis of CdSe Nanocrystals in Nanoliter Droplets"; J. Am. Chem. Soc., vol. 127, No. 40; Sep. 21, 2005; pp. 13854-13861.
Conchouso, D., et al.; "Three-dimensional parallelization of microfluidic droplet generators for a litre per hour volume production of single emulsions"; The Royal Society of Chemistry; Lab Chip, vol. 14, No. 16; May 2014; pp. 3011-3020.
Dangla, R., et al.; "Droplet microfluidics driven by gradients of confinement"; Proceedings of the National Academy of Sciences, vol. 110, No. 3; Jan. 2013; pp. 853-858.
Duncanson, W. J., et al.; "Microfludic synthesis of advanced microparticles for encapsulation and controlled release"; Lab on a Chip; vol. 12, No. 12; Mar. 2012; pp. 2135-2145.
Duraiswamy, S., et al.; "Droplet-Based Microfludic Synthesis of Anisotropic Metal Nanocrystals"; Small, vol. 5, No. 24; Dec. 18, 2009; pp. 2828-2834.
Huang, K. S.; "Microfluidic controlling monodisperse microdroplet for 5-fluorouracil loaded genepin-gelatin microcapsules"; Journal of Controlled Release, vol. 137, No. 1; Mar. 2009; pp. 15-19.
Kahn, S. A.; et al.; "Controlling bubbles using bubbles—microfluidic synthesis of ultra-small gold nanocrystals with gas-evolving reducing agents"; The Royal Society of Chemistry; Lab on a Chip; vol. 12, No. 10; Feb. 2012; pp. 1807-1812.
Nightingale, A. M., et al.; "Controlled Synthesis of III-V Quantum Dots in Microfluidic Reactors"; ChemPhysChem; vol. 10, No. 15; Oct. 2009; pp. 2612-2614.
Park, J. I., et al.; "Microfluidic Synthesis of Polymer and Inorganic Particulate Materials"; Annual Review of Materials Research, vol. 40, No. 1; Jun. 2010; pp. 415-443.
Seo; M., et al.; "Continuous Microfluidic Reactors for Polymer Particles"; American Chemical Society; Langmir, vol. 21, No. 25; Aug. 9, 2005; pp. 11614-11622.
Shah, R. K., et al.; "Designer emulsions using microfluidics"; materialstoday, vol. 11, No. 4; Apr. 2008; pp. 18-27.
Theberge, A. B., et al.; "Microdroplets in Microfluidics: An Evolving Platform for Discoveries in Chemistry and Biology"; Small, vol. 49; Mar. 2010; pp. 5846-5868.
Toldy, A. I., et al.; "Dynamics and Morphological Outcomes in Thin-Film Spherical Crystallization of Glycine from Microfluidic Emulsions: Experimental Studies and Modeling"; American Chemical Society; Crystal Growth & Design, vol. 14, No. 7; Jul. 2014; pp. 3485-3492.
Van Steijin, et al.; "Block-and-break generation of microdroplets with fixed volume"; Biomicrofluidics, vol. 7, No. 2; Apr. 10, 2013; pp. 024108-1 through 024108-8.
Vladisavljevic, G. T., et al.; "Industrial lab-on-a-chip: Design, applications and scale-up for drug discovery and delivery"; Advanced Drug Delivery Reviews, vol. 65, No. 11; Nov. 2013; pp. 1626-1663.
Yang, C. H., et al.; "Microfludic assisted synthesis of multifunctional polycaprolactone microcapsules: incorporation of CdTe quantum dots, Fe3O4 superparamagnetic nanoparticles and tamoxifen anticancer drugs"; The Royal Society of Chemistry, Lab on a Chip, vol. 9, No. 7; Dec. 19, 2008; pp. 961-965.
International Search Report in related International Application No. PCT/IB2016/056032, dated Dec. 14, 2016.
Written Opinion of the International Searching Authority in related International Application No. PCT/IB2016/056032, dated Dec. 14, 2016.

* cited by examiner

| @20ul/min | OWR 1 | OWR 2 | OWR 3 | OWR 4 | OWR 5 |
|---|---|---|---|---|---|
| Symmetric Volume Fixed |  |  |  |  |  |

MICROFLUIDIC DROPLET GENERATOR WITH CONTROLLED BREAK-UP MECHANISM

CROSS-REFERENCE TO RELATED APPLICATIONS

This application is a U.S. National Stage Application of International Application No. PCT/IB2016/056032, filed Oct. 7, 2016, which claims priority to, and the benefit of, U.S. provisional application entitled "MICROFLUIDIC DROPLET GENERATOR WITH CONTROLLED BREAK-UP MECHANISM" having Ser. No. 62/239,562, filed Oct. 9, 2015, the contents of which are incorporated by reference in their entirety.

TECHNICAL FIELD

The present disclosure generally relates to microfluidic devices.

BACKGROUND

Microfluidic droplet generators offer distinctive advantages to create advanced emulsions that cannot be matched by conventional methods such as membrane or batch emulsification (Theberge, et al., *Small*, 2010, 49:5846-5868). Since microfluidic droplets are created in a confined and controlled space within a chip, they can be used as micro-reactors to perform delicate chemical reactions that take advantage of the scaling laws associated with miniaturization (Carroll, et al., *Microdroplet Technology*, 2012).

Quantum dots (Nightingale and de Mello, *Chem. Phys. Chem.*, 2009, 10(15):2612-2614), nanocrystals and nanoparticles (Chan, et al., *J. Am. Chem. Soc.*, 2005, 127(40):13854-13861; Khan and Duraiswamy, *Lab on a chip*, 2012, 12(10): 1807-1812; Duraiswamy and Khan, *Small*, 2009, 5(24): 2828-2834), active pharmaceutical ingredients (Toldy, et al., *Crystal Growth & Design*, 2014, 14(7):3485-3492), engineered emulsions, polymer particles (Seo, et al., Langmuir, 2005, 21(25):11614-11622; Park, et al., *Annu. Rev. Mater. Res.*, 2010, 40(1):415-443), microcapsules (Shah, et al, *Materials Today*, 2008, 11(4):18-27; Duncanson, et al, *Lab on a Chip*, 2012, 12(12):2135-2145; Huang, et *Journal of Controlled Release*, 2009, 137(1):15-19; Yang, et al., *Lab on a Chip*, 2009, 9(7):961-965), and other high-value applications have been synthesized using droplets that work as micro-reactors.

A challenge that this technology has to overcome is related to its limited volume production, which has hindered their adoption in the industry. A single chip can generate up to 10 ml/hour of product. This can be enough for research settings but is far from being sustainable for industrial applications (Conchouso, et al., *Lab on a Chip*, 2014, 14(16):3011-3020; Vladisavljević, et al., *Advanced Drug delivery Reviews*, 2013, 65(11):1626-1633). Scale-up of droplet microfluidics can theoretically be accomplished by parallelization of many of these devices in a single system, thereby reducing the number of connections and active fluidic pumps that are needed when many droplet generators are run simultaneously. However, such approaches have often failed to achieve the required size uniformity of the produced droplets under operating conditions. There remains a need for improved microfluidic droplet generators capable of parallelization and scaling for large-scale industrial applications.

It is therefore an object of this disclosure to provide improved microfluidic droplet generators.

It is a further object of this disclosure to provide microfluidic systems that parallelize improved microfluidic droplet generators for large-scale droplet generation.

It is an additional object of this disclosure to provide methods of making the improved microfluidic droplet generators and microfluidic systems.

It is also an object of this disclosure to provide methods of using the improved microfluidic droplet generators and microfluidic systems to generate micro-scale droplets, e.g. for large-scale industrial applications.

SUMMARY

The present disclosure provides microfluidic droplet generation devices. In an embodiment, the microfluidic droplet generation devices and systems include devices and systems parallelizing the microfluidic droplet generation. In various aspects the system provides microfluidic droplet generation devices having a symmetric block-and-break mechanism and a tapered droplet generation zone. In various other aspects the system provides for uniform and large-scale generation of microdroplets.

In one or more aspects, the devices can include a droplet generation zone that can have a tapered region, giving rise to uniform droplet growth. The devices can include a dispersed-phase input channel coupled to the droplet generation zone at a first junction and an output channel coupled to the droplet generation zone at a second junction. The devices can include a first and a second break channel intersecting the dispersed-phase input channel at the first junction. The devices can include a first and a second bypass channel intersecting the output channel at the second junction. The devices can include continuous-phase input channels coupled to the bypass channels. The continuous-phase input channels can include a first continuous-phase input channel coupled to the first bypass channel, and a second continuous-phase input channel coupled to the second bypass channel.

In any one or more aspects, the droplet generation zone can comprise a tapered region having an angle of aperture of about 5 to 20 degrees. The droplet generation zone can have a volume of about 1 pL to 50 nL. The droplet generation zone can have a smallest width of about 5 µm to 30 µm and a largest width of about 80 µm to 120 µm. The droplet generation zone can have a length of about 50 µm to 2000 µm. The dispersed-phase input channel can have a width of about 10 µm to 1000 µm. The output channel can have a width of about 10 µm to 3000 µm.

The first break channel and the second break channel can be symmetrically arranged with respect to the dispersed-phase input channel and/or with respect to the droplet generation zone; and/or wherein one or both of the first break channel and the second break channel intersects the dispersed-phase input channel at an essentially perpendicular angle. One or both of the first break channel and the second break channel can have a width of about 5 µm to 100 µm, or a width of about 10 µm to 1000 µm. The first bypass channel and the second bypass channel can be symmetrically arranged with respect to the output channel and/or with respect to the droplet generation zone and/or intersect the output channel at an essentially perpendicular angle. One or more additional connecting channels connecting one or both of the first bypass channel and the second bypass channel to the droplet generation zone can be included. The connecting channels have a width of about 10 µm to 1000 µm.

Microfluidic systems are provided including the microfluidic droplet generation devices. The systems can include from 100 to 1000 of the microfluidic droplet generation devices. The microfluidic systems can be a multilayer structure having one or more droplet generation layers, each containing a plurality of the microfluidic droplet generation devices. The microfluidic systems can contain distribution layers for the dispersed-phase and the continuous-phase, as well as a cap layer to cover one or more channels in the layer below. The dispersed-phase inlet channels of the microfluidic droplet generation devices can each be fluidly coupled to a channel in the dispersed phase distribution layer. The continuous-phase inlet channels of the microfluidic droplet generation devices can each be fluidly coupled to a channel in the continuous phase distribution layer. The system can be a multilayer structure comprising: one or more droplet generation layers, each comprising a plurality of the microfluidic droplet generation devices; a dispersed-phase distribution layer; a continuous-phase distribution layer; and a cap layer; wherein the dispersed phase inlet channels of the microfluidic droplet generation devices are each fluidly coupled to a channel in the dispersed phase distribution layer; and the continuous phase inlet channels of the microfluidic droplet generation devices are each fluidly coupled to a channel in the continuous phase distribution layer.

Methods of generating a droplet of a dispersed-phase liquid in a continuous-phase liquid are provided. The methods can include using a microfluidic droplet generation device or a microfluidic system described herein. The methods can include causing a continuous phase liquid to be introduced into the continuous phase input channel at a continuous phase flow rate. The continuous-phase flow rate can be about 1 µL/min to 80 µL/min. The continuous-phase liquid can be a hydrophobic liquid such as oil, optionally containing a surfactant. The methods can include causing a dispersed phase liquid to be introduced into the dispersed phase input channel at a dispersed phase flow rate to generate a droplet of the dispersed-phase liquid dispersed in the continuous-phase liquid. The dispersed-phase flow rate can be about 1 µL/min to 80 µL/min. The dispersed-phase liquid can include a hydrophilic liquid such as water. The hydrophobic liquid can further comprise a salt, small molecule, biomolecule, polymer, nano-crystal, or nanoparticle dissolved or suspended in the hydrophobic liquid.

Other systems, methods, features, and advantages of the present disclosure of a microfluidic droplet generation device will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings like reference numerals designate corresponding parts throughout the several views.

DETAILED DESCRIPTION

Figure 1:
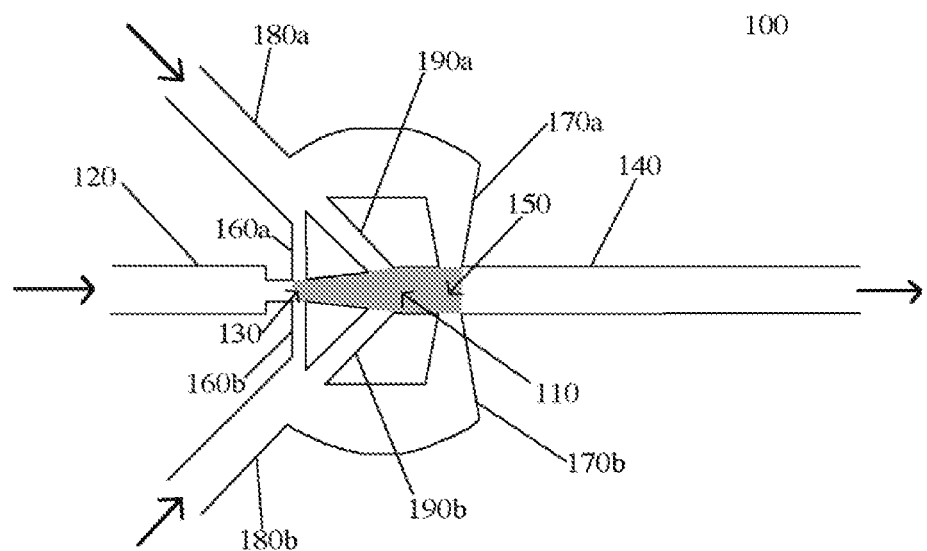
FIG. 1 depicts an exemplary embodiment of a microfluidic droplet generation device.

Described below are various embodiments of the present systems and methods for microfluidic droplet generation. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of micro-fabrication, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'" includes "about 'x' to about y".

DEFINITIONS

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The term "monodisperse", as used herein, refers to a population of droplets (e.g., aqueous droplets dispersed within an organic solvent) wherein the droplets have substantially identical size and shape. A "monodisperse" population of particles can mean that at least about 60%, 70%, 80%, 90%, 95%, 99%, 99.5%, or more of the droplets fall within a specified particle volume that is within plus or minus about 25%, 20%, 15%, 10%, 5%, 3%, 2%, 1%, or less of the root-mean-square (rms) size of the particles in the population.

The term "essentially perpendicular", as used herein, refers to channels that intersect to form an angle of about 80° to 100°, 85° to 95°, 87° to 93°, 88° to 92°, 89° to 91°, or about 90°.

Microfluidic Droplet Generation Devices

In various embodiments, the present disclosure provides devices, systems and methods for microfluidic droplet generation, in particular for the large-scale production of droplets in a microfluidic. The devices and systems can be used to generate monodisperse distributions of droplets in a microfluidic over a range of flow rates for the two fluids. The microfluidic droplet generation devices can be parallelized in large-scale microfluidic systems for the production of droplets, e.g. for productions of about 1 L/hr with small coefficients of variation.

Figure 2:
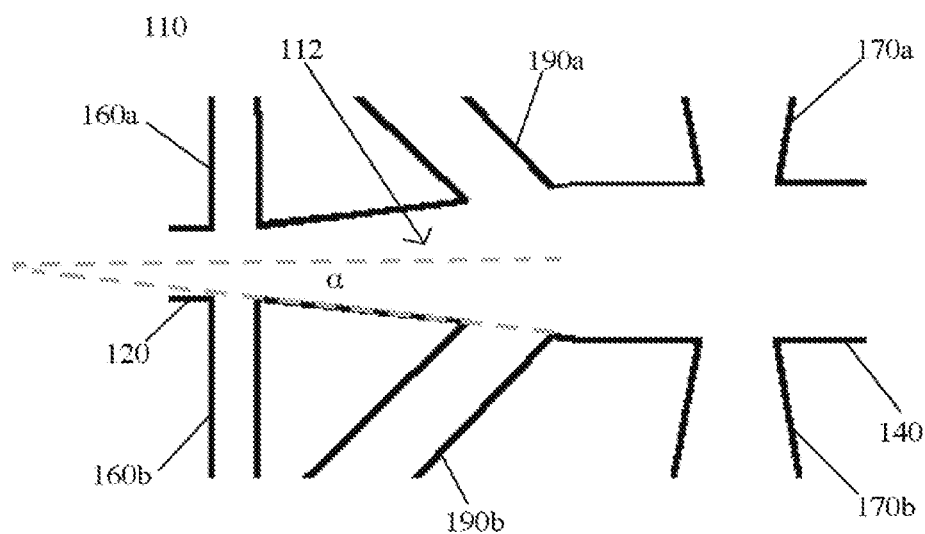
FIG. 2 depicts a detailed view of the droplet generation zone of an exemplary microfluidic droplet generation device.
Figure 3:
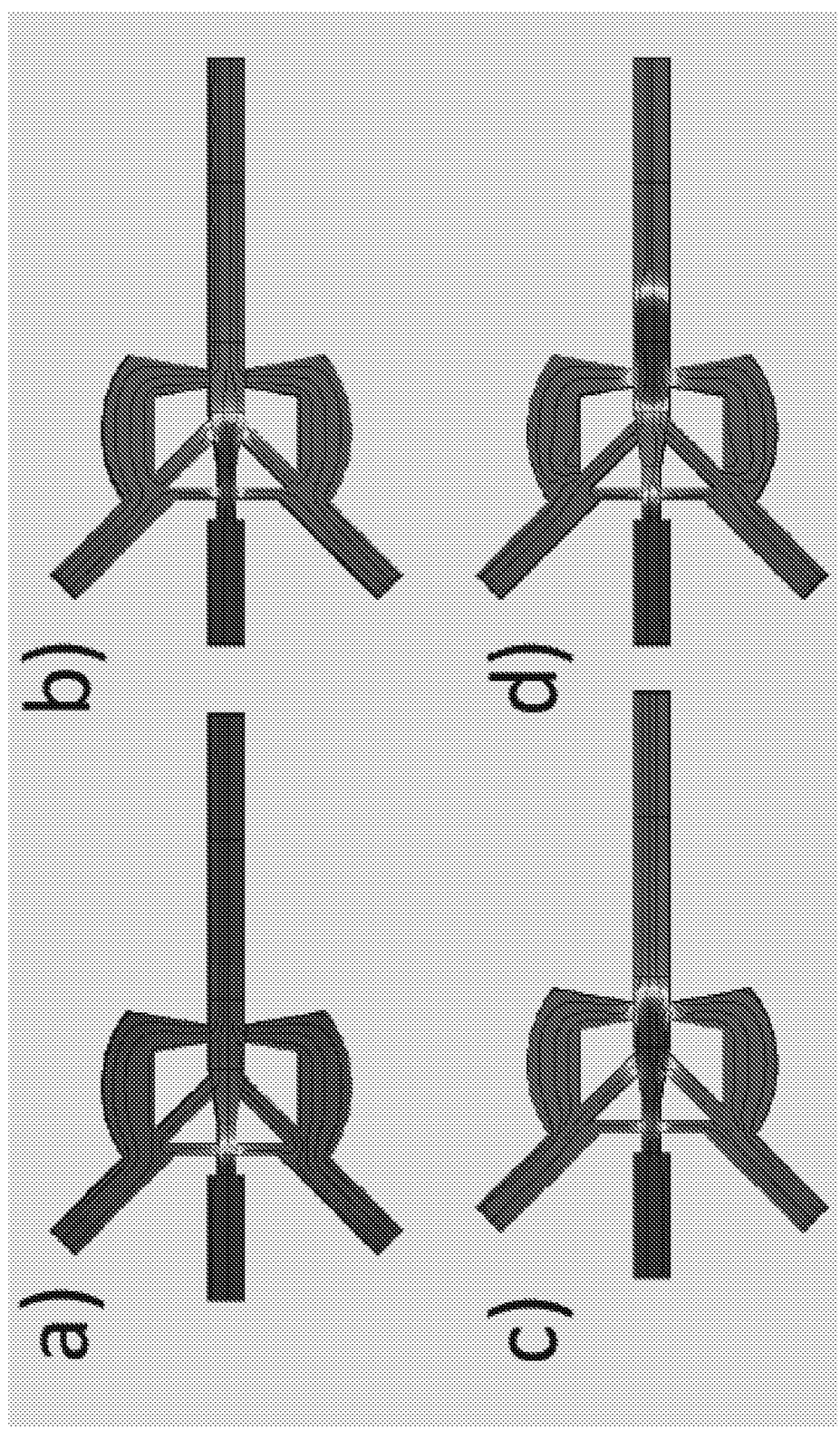
FIGS. 3A-3D are diagrams depicting several stages of the droplet generation in an exemplary microfluidic droplet generation device.
Figure 5:
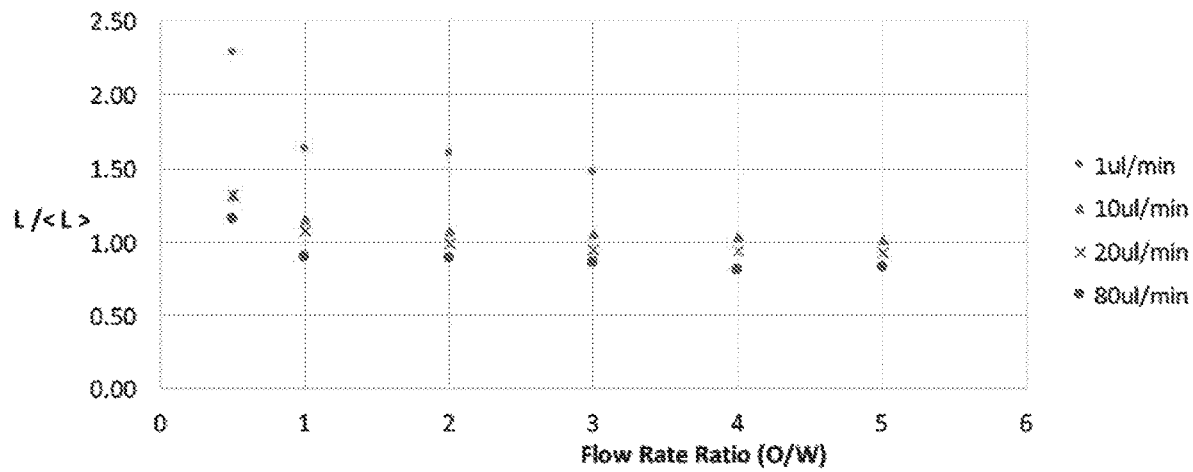
FIG. 5 is a graph of the normalized volume (L/<L>) as a function of the oil/water ratio (OWR) at combined flow rates of 1 µL/min, 10 µL/min, 20 µL/min, and 80 µL/min. <L> is the target volume of the droplet generation region.

In an embodiment, a constant-volume droplet generation device is provided based on a geometry that uses both gradients of confinement and a bypass system. An exemplary droplet generation device is depicted in FIGS. 1-2. The operation of the proposed geometry is graphically depicted in FIGS. 3A-3D. The droplet formation undergoes droplet growth and break-up after the bypasses are blocked. The geometry also allows the production of droplets of constant volume at a wide range of total flow rates and flow rate ratios as shown in FIG. 5. This behavior can allow for efficient parallel systems described in detail below because all droplet generators will produce droplets of the same size even if the flow feeding the generators varies from one device to another.

FIG. 1 depicts one embodiment of a microfluidic droplet generation device 100. The droplet generation device 100 contains a droplet generation zone 110 configured for generation of micro-scale droplets of a dispersed-phase liquid in a continuous-phase liquid with a well-defined size. The droplet generation device 100 can contain a dispersed-phase input channel 120 coupled to the droplet generation zone 110 at a first junction 130. The droplet generation device 100 can contain an output channel 140 coupled to the droplet generation zone 100 at a second junction 150. The droplet generation device 100 can contain a first break channel 160a and a second break channel 160b each intersecting the dispersed-phase input channel 120 at the first junction 130. The droplet generation device 100 can contain a first bypass channel 170a and a second bypass channel 170b each intersecting the output channel 140 at the second junction 150. The droplet generation device 100 can contain a first continuous-phase input channel 180a coupled to the first bypass channel 170a. The droplet generation device 100 can contain a second continuous-phase input channel 180b coupled to the second bypass channel 170b. The droplet generation device 100 can contain a first connecting channel 190a connecting the first bypass channel 170a to the droplet generation zone 110. The droplet generation device 100 can contain a second connecting channel 190b connecting the second bypass channel 170b to the droplet generation zone 110. The droplet generation device 100 can have a pinch junction in the dispersed-phase input channel 120 at the first junction 130. The width of the pinch junction, i.e. the width of the dispersed-phase input channel 120 at the first junction 130 can be about 20 μm to 70 μm, or about 50 μm.

The droplet generation device 100 contains a droplet generation zone 110. The volume of the droplet generation zone 110, depicted more clearly as the shaded region in FIG. 1, determines the intended volume of the droplet. FIG. 2 depicts a detailed view of the droplet generation zone 110. The droplet generation zone 110 can have a tapered region 112. The tapered region 112 can have an angle of aperture a from about 5 to 20 degrees or about 10 to 20 degrees. As the disperse-phase liquid flows through the dispersed-phase input channel 120, the front of the droplet begins to form, blocking off the flow of the continuous-phase liquid through the first break channel 160a and a second break channel 160b, FIG. 3A. The droplet can grow at a controlled rate within the tapered region 112 of the droplet generation zone 110. As the droplet continues to grow it blocks flow of the continuous-phase liquid through the first connecting channel 190a and the second connecting channel 190b, FIG. 3B. As the droplet begins to fill the droplet generation zone 110, the droplet blocks flow of the continuous-phase liquid through the first bypass channel 170a and a second bypass channel 170b, causing an increased pressure at the first junction 130, FIG. 3C. The increased pressure at the first junction 130 causes a break in the dispersed-phase liquid forming the droplet, thereby restoring flow of the continuous-phase liquid through the first break channel 160a and a second break channel 160b and expelling the droplet of the dispersed-phase liquid in a continuous-phase liquid through the outlet channel 140, FIG. 3D.

The microfluidic droplet generation device can contain a variety of channels. The droplet generation device can contain a dispersed-phase input channel coupled to the droplet generation zone at a first junction. The droplet generation device can also contain an output channel coupled to the droplet generation zone at a second junction. The droplet generation device can contain a pair of break channels each intersecting the dispersed-phase input channel at the first junction. The droplet generation device also can contain a pair of bypass channels each intersecting the output channel at the second junction. The droplet generation device can contain one or more continuous-phase input channels coupled to the bypass channels. The droplet generation device can contain one or more connecting channels connecting a bypass channel to the droplet generation zone.

Each of the channels in the microfluidic droplet generation device can have any desired width between about 5 μm and 500 μm, e.g. about 10 μm to 400 μm, about 20 μm to 400 μm, or about 20 μm to 200 μm. In some embodiments the channels will have different widths. In particular, the break channels can have a width that is smaller than the width of the dispersed-phase input channel. In some embodiments the input channels can have a width of about 100 μm, the bypass channel can have a width of about 50 μm, the break channels can have a width of about 30 μm, and the output channel can have a width of about 100 μm.

The droplet generation device can contain a droplet generation zone. The volume of the droplet generation zone can determine the intended volume of the droplet. In some embodiments the droplet generation zone has a volume of about 1 pL to 50 nL or about 2 pL to about 20 nL. The droplet generation device can generate droplets having a volume within ±15%, ±12%, ±10%, ±8%, ±6%, ±5%, ±4%, ±3%, ±2%, or ±1% of the volume of the droplet generation zone.

The droplet generation zone can have a tapered region. The angle of aperture (i.e. angle forming the gradient of confinement in the tapered region) can influence droplet formation. The angle of aperture can create a uniform droplet growth within the droplet generation zone. The configuration of the tapered region and the angle within the droplet generation zone is configured for a planar design, which is suitable for current fabrication methods. The tapered region can have an angle of aperture of about 5 to 20 degrees, e.g. about 10 degrees. The droplet generation zone can have a smallest width of about 5 μm to 50 μm or 5 μm to 30 μm. The droplet generation zone can have a largest width of about 80 μm to 120 μm, e.g. about 100 μm.

As the disperse-phase liquid flows through the dispersed-phase input channel, the front of the droplet begins to form, blocking off the flow of the continuous-phase liquid through the break channels. The droplet can grow at a controlled rate within the tapered region of the droplet generation zone. As the droplet continues to grow it blocks flow of the continuous-phase liquid through any connecting channels. As the droplet fills the droplet generation zone, the droplet blocks flow of the continuous-phase liquid through the bypass channels, causing an increased pressure at the first junction.

The increased pressure at the first junction causes a break in the dispersed-phase liquid thus forming the droplet and restoring flow of the continuous-phase liquid through the break channels, expelling a droplet through the outlet channel.

The droplet generation device can be symmetrical, e.g. it can be symmetrically arranged with respect to a central plane passing through the dispersed-phase input channel, the droplet generation zone, and/or the output channel. For example, the droplet generation device can have a pair of break channels each arranged symmetrically on opposite sides of the dispersed-phase input channel. In some embodiments the break channels intersect the dispersed-phase input channel at an essentially perpendicular angle. The droplet generation device can also have a pair of bypass channels each arranged symmetrically on opposite sides of the droplet generation zone. In some embodiments the bypass channels intersect the output channel at an essentially perpendicular angle. The symmetrical configuration of the block and break mechanism can help solve undesirable wettability problems (commonly observed in traditional T-junctions) because it allows for a continuous & uniform oil layer between the channel walls and the disperse phase at all times. In other words, the disperse phase is in lesser contact with the channels walls during droplet formation.

The droplet generation device can exhibit small pressure fluctuations during operation. This pressure variation is due to the droplet break-up and the Laplace pressure jumps in multiphase flow. The droplet generation device can exhibit a pressure variation at the continuous-phase input channel that is about 150 Pa, 100 Pa, 70 Pa, 50 Pa, or less during operation. The droplet generation device can exhibit pressure variation at the dispersed-phase input channel that is about 300 Pa, 200 Pa, 150 Pa, 100 Pa, or less during operation. Having a lower fluctuation can be beneficial, especially for parallel microfluidic systems described below, because it means less interaction between adjacent devices. This also means that the parallelization of these devices can be more robust and produce droplets of increased monodispersity.

Computational fluid dynamics (CFD) was used to simulate the laminar two-phase flow using the phase field method. A continuous phase field variable describes and tracks the interphase between both immiscible fluids in a time dependent study.

Navier-Stockes $$\rho \frac{\partial u}{\partial t} + \rho(u \cdot \nabla)u + \nabla p - \nabla \cdot \eta(\nabla u + (\nabla u)^T) = 0$$

Continuity-Equation $$\nabla \cdot u = 0$$

The simulation parameters are described in Table 1.

TABLE 1

| Parameter | Value |
|---|---|
| Oil Density ($\rho_o$) | 750 Kg/m$^3$ |
| Water Density ($\rho_w$) | 1000 Kg/m$^3$ |
| Oil Dynamic Viscosity ($\mu_o$) | 1.34 mPa · s |
| Water Dynamic Viscosity ($\mu_w$) | 1 mPa · s |
| Contact Angle ($\theta$) | 3 π/4 rad |
| Interfacial Tension ($\sigma$) | 5 × 10$^{-3}$ N/m |

Figure 4:
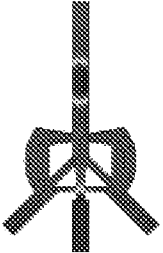
FIG. 4 depicts a series of diagrams demonstrating the droplet generation in an exemplary microfluidic droplet generation device as a function of the oil/water ratio (OWR) from 1 to 5 at a combined flow rate of 20 µL/min.
Figure 4:
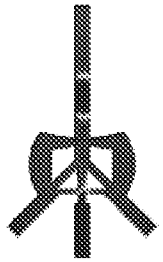
Figure 4:
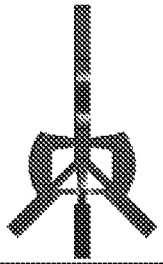
Figure 4:
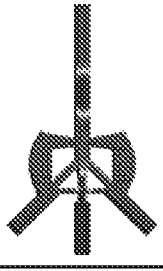
Figure 4:
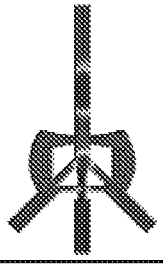
Figure 6:
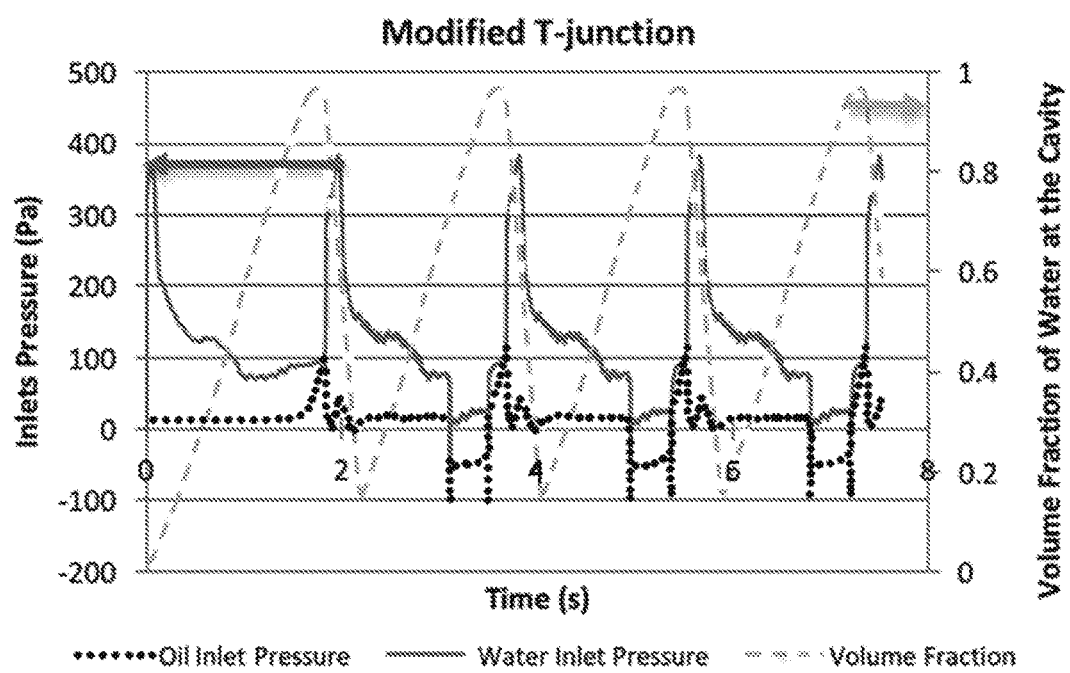
FIG. 6 is a graph of the inlet pressure in a reference T-junction droplet generation device at the dispersed-phase (water) inlet and the continuous-phase (oil) inlet (Pa, left axis) and the volume fraction of water in the droplet generation region (cavity) as a function of time (5).
Figure 7:
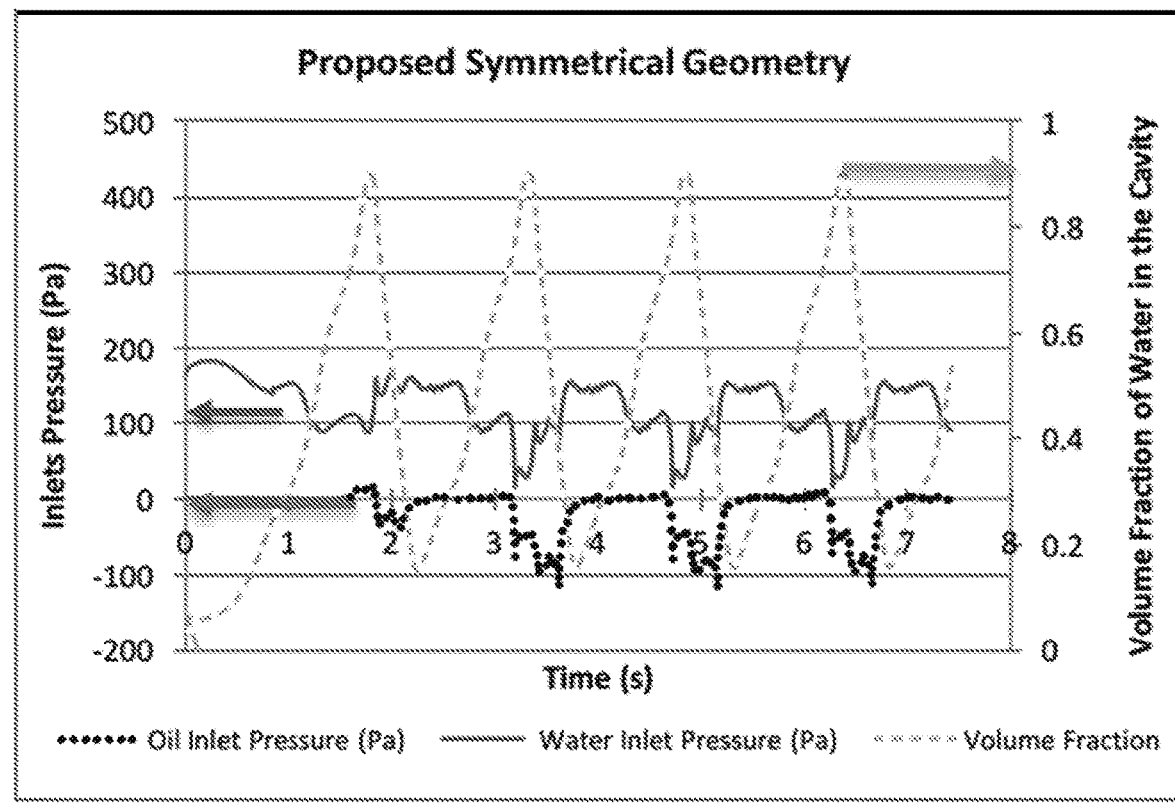
FIG. 7 is a graph of the inlet pressure in an exemplary droplet generation device at the dispersed-phase (water) inlet and the continuous-phase (oil) inlet (Pa, left axis) and the volume fraction of water in the droplet generation region (cavity) as a function of time (s).

The droplet generation device demonstrated uniform droplet generation over a range of oil-to-water ratios (OWR) ranging from 1 to 5 at a flow rate of 20 µL/min (FIG. 4). The volumes of the droplets are shown in FIG. 5 (normalized to the volume of the droplet generation zone) at various oil-to-water ratios and at flow rates ranging from 1 µL/min to 80 µL/min. The results demonstrate droplet volumes that are uniform, e.g. uniform volume over oil-to-water ratios from 1 to 5 and for flow rates of about 1 µL/min or greater. The pressure at the oil inlet and the water inlet are shown in FIG. 6 and FIG. 7 for a reference T-junction droplet generator and for the droplet generation device provided herein. The results demonstrate reduced pressure fluctuations as compared to the reference device.

The droplet generation device can be manufactured in a variety of substrate materials. For example, the substrate material can be a polymer such as polymethylmethacrylate (PMMA) or polydimethylsiloxane (PDMS), glass, quartz, silicon, SUB, polyimide, cyclic olefin copolymer (COC), off-stoichiometry thiol-enes (OSTE), or propylene.

Microfluidic Systems

Microfluidic systems can combine the microfluidic droplet generation devices described herein with other microfluidic devices. Many suitable microfluidic devices are known in the art, for example microfluidic pumps, microfluidic mixers, etc. The microfluidic systems can combine more than one microfluidic droplet generation device to achieve parallelization of the microfluidic droplet generation devices. The microfluidic systems can include from 10 to 10000 microfluidic droplet generation devices, 100 to 1000 microfluidic droplet generation devices, from 200 to 800 microfluidic droplet generation devices, or about 500 microfluidic droplet generation devices. By combining multiple microfluidic droplet generation devices in a single microfluidic system, the number of connections and active fluidic pumps can be reduced. For example a dispersed-phase distribution channel can be coupled to the dispersed-phase input channels of the microfluidic droplet generation devices, thereby requiring only a single connection for the dispersed phase. A continuous-phase distribution channel can be coupled to the continuous-phase input channels of the microfluidic droplet generation devices, thereby requiring only a single connection for the continuous phase. An important characteristic that a parallel system can retain from the single unit system is the size uniformity of the produced droplets. A narrow size distribution (i.e. coefficient of variation lower than 5%) allows consistent conditions and repeatability from one droplet to another.

Figure 8:
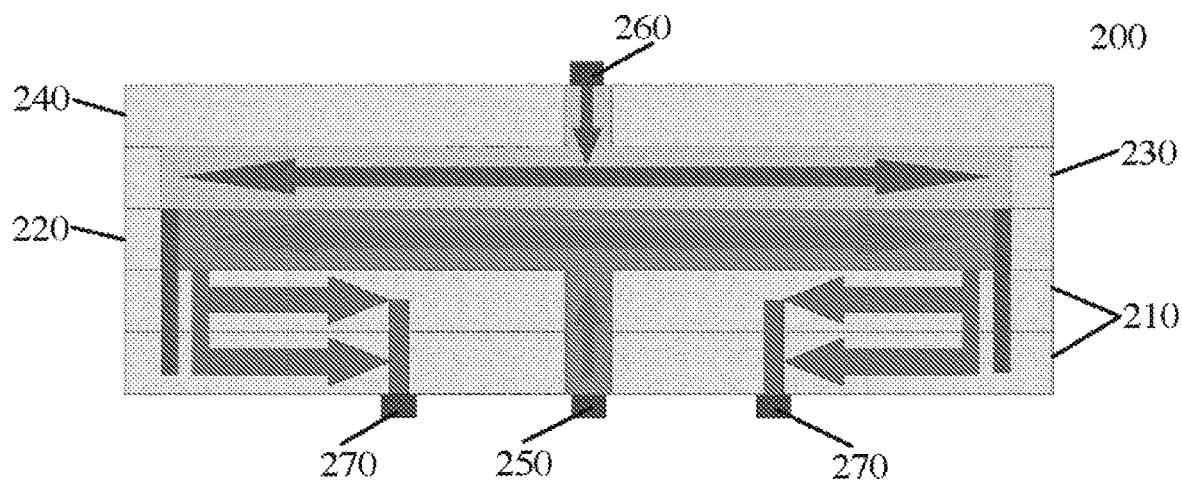
FIG. 8 is a diagram of an exemplary multilayer microfluidic structure containing a plurality of microfluidic droplet generation devices.
Figure 9:
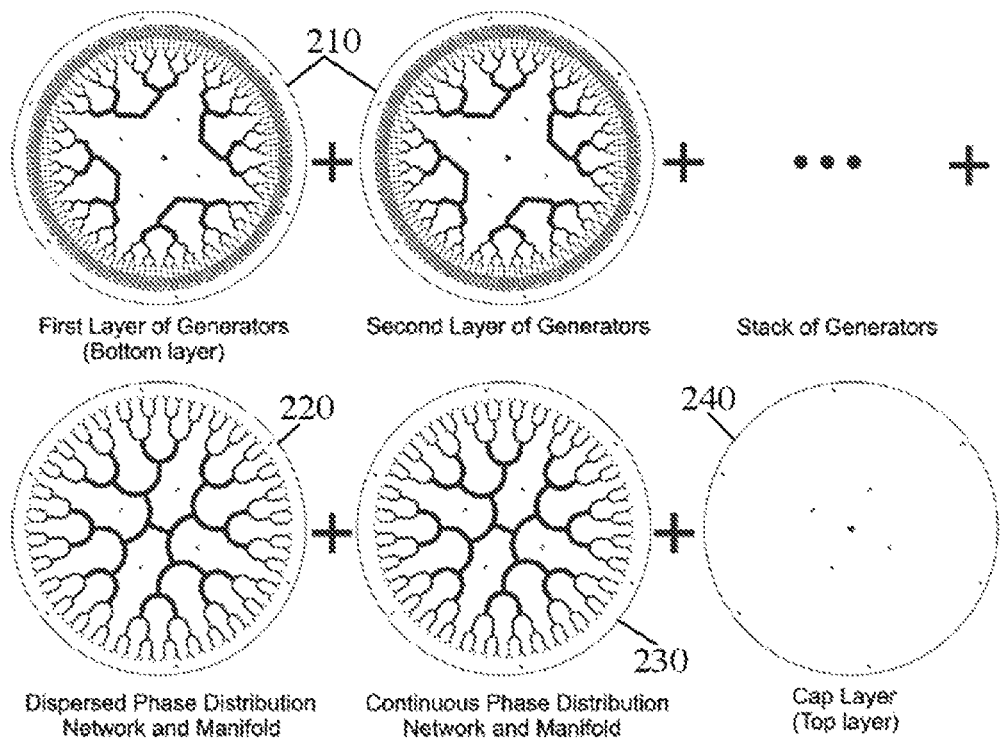
FIG. 9 is a diagram depicting the layers of an exemplary multilayer microfluidic structure containing a plurality of microfluidic droplet generation devices.
Figure 10:
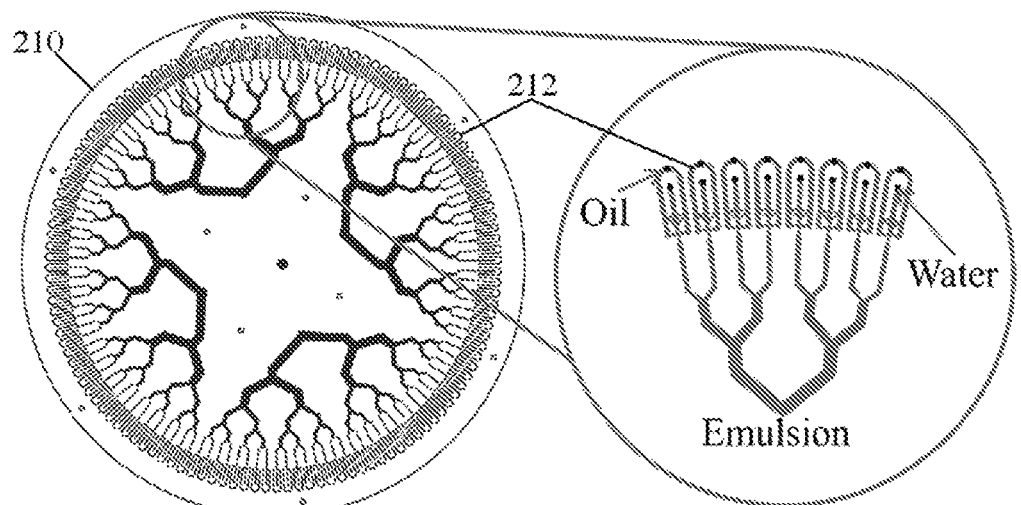
FIG. 10 is a diagram of a droplet generation layer containing a plurality of microfluidic droplet generation devices.

An exemplary microfluidic structure 200 is depicted in FIGS. 8-10. The microfluidic structure 200 can be a multilayer structure. The microfluidic structure 200 can contain one or more droplet generation layers 210, each containing a plurality of microfluidic droplet generation devices 212, for example any of the droplet generation devices described herein. The microfluidic structure 200 can contain a dispersed-phase distribution layer 220 configured to direct flow of a dispersed-phase fluid to each of the droplet generation devices 212. The microfluidic structure 200 can contain a continuous-phase distribution layer 230 configured to direct flow of a continuous-phase fluid to each of the droplet generation devices 212. The microfluidic structure 200 can contain a cap layer 240 as the topmost layer to cover the micro-channels. The microfluidic structure 200 can contain a dispersed-phase inlet 250 configured to direct a dispersed-phase fluid from outside the device into the channels of the dispersed-phase distribution layer 220. The microfluidic structure 200 can contain a continuous-phase inlet 260 configured to direct a continuous-phase fluid from outside the device into the channels of the continuous-phase distribution layer 230.

The microfluidic systems can be capable of large-capacity generation of droplets of a dispersed-phase liquid in a continuous-phase liquid. For example, droplet generation in a microfluidic system can be about 500 mL/hr, 1 L/hr, 1.2 L/hr, 1.5 L/hr, 2.0 L/hr, 2.5 L/hr or more. The microfluidic systems can generate particles having a coefficient of variation of about 10%, 8%, 6%, 5%, 4%, 3%, 2%, 1%, or less.

Methods of Making Microfluidic Droplet Generation Devices and Systems

The microfluidic droplet generation devices and microfluidic systems described herein can be made by techniques known in the art, for example by soft lithography techniques, etching techniques, or by imprinting.

In one embodiment, the substrate of the microfluidic device can contain an elastomer rubber. The elastomer rubber can typically include a thermosetting polymer, i.e., a polymeric material that irreversibly cures. The elastomer rubber employed typically can include carbon, hydrogen, oxygen and/or silicon. In one embodiment, the elastomer rubber can be an unsaturated rubber (vulcanized or non-vulcanized) such as, for example, polyisoprene, polybutadiene, chloroprene rubber, polychloroprene rubber, butyl rubber (i.e., a copolymer of isobutylene and isoprene), halogenated butyl rubbers (e.g., chloro butyl rubber and bromo butyl rubber), styrene-butadiene rubber, nitrile rubber (i.e., copolymer of butadiene and acrylonitrile), and halogenated nitrile rubbers. In another embodiment, the elastomer rubber that can be employed as a substrate material includes a saturated rubber such as, for example, ethylene propylene rubber, EPDM rubber (i.e., ethylene propylene diene rubber), epichlorohydrin rubber, polyacrylic rubber, silicone rubber, fluorosilicone rubber, fluoroelastomers, perfluoroelastomers, polyether block amides, ethylene-vinyl acetate, and chlorosulfonated polyethylene. In another embodiment, the substrate of the microfluidic device can be glass, quartz or silicon.

In one embodiment, the microfluidic devices and systems of the present disclosure can be formed utilizing an imprinting process. In such a process, a master material that can be patterned by etching is first selected. Examples of master materials that can be employed in the present disclosure in forming the microfluidic devices include, but are not limited to, semiconductor wafers, glass, and quartz. In one embodiment of the present disclosure, the master material is a silicon wafer.

After providing the master material, one or more lithographic and etching steps can be used to define the channels of the microfluidic device or systems described above. Lithography includes, for example, applying a photoresist material to an upper surface of the master material, exposing the photoresist material to a desired pattern of radiation and then developing the exposed resist material utilizing a resist developer. In some embodiments, an etch mask can be applied to the master material prior to forming the photoresist material. Following the patterning of the photoresist, the exposed portions of the master material that were not protected by the patterned photoresist material are etched. In one embodiment, etching can include a dry etching process including, for example, reactive ion etching, ion beam etching, and plasma etching. In another embodiment, etching can include a chemical wet etchant. The patterned resist can be removed by utilizing a conventional resist removal processing such as, for example, ashing. In some embodiments, a second patterned resist can be formed. In this embodiment, a second etching step can be performed or the second etching step can be omitted.

In some embodiments, lithography and etching are used in forming the microfluidic device or system in a substrate made of glass, quartz or silicon.

Methods of Generating Droplets

The droplet generation devices and the microfluidic, systems described herein can be use to generate micro-droplets of a dispersed phase liquid in a continuous-phase liquid for a variety of applications. The micro-droplets can be used for controlled micro-particle or micro-emulsion formation, as micro-reactors, quantum dots, nano-crystallization, etc.

Methods of generating droplets of a dispersed-phase liquid in a continuous-phase liquid are provided. The methods can include using a microfluidic droplet generation device or a microfluidic system described herein.

The methods can include causing a continuous-phase liquid to be introduced into the continuous-phase input channel at a continuous phase flow rate. The continuous-phase liquid can be a hydrophobic liquid, for example oil such as silicon oil, mineral oil, or other water immiscible oils; or an organic solvent. The continuous-phase liquid can also contain one or more surfactants or lipids that stabilize the droplet upon formation. The continuous-phase flow rate can be about 1 µL/min to 80 µL/min per droplet generation device or about 20 µL/min to 80 µL/min per droplet generation device.

The methods can include causing a dispersed-phase liquid to be introduced into the dispersed-phase input channel at a dispersed-phase flow rate to generate a droplet of the dispersed-phase liquid dispersed in the continuous-phase liquid. The dispersed-phase liquid can include water or other hydrophilic liquid. The dispersed-phase liquid can further include one or more dissolved or suspended species including salts, small molecules, biomolecules, polymers, nano-crystals, nanoparticles, and the like. The dispersed-phase flow rate can be about 1 µL/min to 80 µL/min per droplet generation device or about 20 µL/min to 80 µL/min per droplet generation device. The pressure can be about 100 to 200 Pa.

The methods can be used for generating droplets for the crystallization of large bio(molecules) such as pharmaceutical ingredients or for the development of higher-order materials for the food and pharmaceutical industry.

It should be emphasized that the above-described embodiments are merely examples of possible implementations. Many variations and modifications may be made to the above-described embodiments without departing from the principles of the present disclosure. One skilled in the art will understand that many different materials can be used in the nanowire fabrication process. One skilled in the art will also understand that many different modes of operation of the system are possible. For example, the number of generators, the dispersed phase and continuous phase liquids can all be varied. All such modifications and variations are intended to be included herein within the scope of this disclosure and protected by the following claims.

We claim:

1. A microfluidic droplet generation device, the device comprising:
 a droplet generation zone;
 a dispersed-phase input channel coupled to the droplet generation zone at a first junction;
 an output channel coupled to the droplet generation zone at a second junction;
 a first and a second break channel intersecting the dispersed-phase input channel at the first junction;
 a first and a second bypass channel intersecting the output channel at the second junction;
 a first continuous-phase input channel coupled to the first bypass channel;
 a second continuous-phase input channel coupled to the second bypass channel;
 a first connecting channel connected with a first end to the droplet generation zone and with a second end to the first bypass channel; and
 a second connecting channel connected with a first end to the droplet generation zone and with a second end to the second bypass channel.

2. The microfluidic droplet generation device of claim 1, wherein the droplet generation zone comprises a tapered region having an angle of aperture of about 5 to 20 degrees.

3. The microfluidic droplet generation device of claim 1, wherein the droplet generation zone has a volume of about 1 pL to 50 nL.

4. The microfluidic droplet generation device of claim 1, wherein the droplet generation zone as a smallest width of about 5 µm to 30 µm and a largest width of about 80 µm to 120 µm.

5. The microfluidic droplet generation device of claim 1, wherein the first break channel and the second break channel are symmetrically arranged with respect to the dispersed-phase input channel and/or with respect to the droplet generation zone; and/or
 wherein one or both of the first break channel and the second break channel intersects the dispersed-phase input channel at an essentially perpendicular angle.

6. The microfluidic droplet generation device of claim 1, wherein the first bypass channel and the second bypass channel are symmetrically arranged with respect to the output channel and/or with respect to the droplet generation zone and/or intersects the output channel at an essentially perpendicular angle.

7. The microfluidic droplet generation device of claim 1, wherein one or both of the first bypass channel and the second bypass channel have a width of about 10 µm to 1000 µm.

8. The microfluidic droplet generation device of claim 1, wherein the first and second connecting channels directly connect to a tapered region of the droplet generation zone.

9. The microfluidic droplet generation device of claim 8, wherein the first and second connecting channels have a width of about 10 µm to 1000 µm.

10. A microfluidic system comprising from 100 to 3000 microfluidic droplet generation devices, wherein each microfluidic droplet generation device comprises:
 a droplet generation zone;
 a dispersed-phase input channel coupled to the droplet generation zone at a first junction;
 an output channel coupled to the droplet generation zone at a second junction;
 a first and a second break channel intersecting the dispersed-phase input channel at the first junction;
 a first and a second bypass channel intersecting the output channel at the second junction;
 a first continuous-phase input channel coupled to the first bypass channel;
 a second continuous-phase input channel coupled to the second bypass channel;
 a first connecting channel connected with a first end to the droplet generation zone and with a second end to the first bypass channel; and a second connecting channel connected with a first end to the droplet generation zone and with a second end to the second bypass channel.

11. The microfluidic system of claim 10, wherein the dispersed phase input channel of each of the microfluidic droplet generation devices is coupled to a dispersed phased distribution channel.

12. The microfluidic system of claim 10, wherein the continuous phase input channels of each of the microfluidic droplet generation devices are coupled to a continuous phased distribution channel.

13. The microfluidic system of claim 10, wherein the microfluidic system is a multilayer structure comprising
one or more droplet generation layers, each comprising a plurality of the microfluidic droplet generation devices;
a dispersed-phase distribution layer;
a continuous-phase distribution layer; and
a cap layer;
wherein the dispersed phase inlet channels of the microfluidic droplet generation devices are each fluidly coupled to a channel in the dispersed phase distribution layer; and
the continuous phase inlet channels of the microfluidic droplet generation devices are each fluidly coupled to a channel in the continuous phase distribution layer.

14. A method of generating a droplet of a dispersed-phase liquid in a continuous-phase liquid using a microfluidic droplet generation device, the method comprising:
causing a continuous phase liquid to be introduced into first and second continuous phase input channels at a continuous phase flow rate; and
causing a dispersed phase liquid to be introduced into a dispersed phase input channel at a dispersed phase flow rate to generate a droplet of the dispersed-phase liquid dispersed in the continuous-phase liquid,
wherein the microfluidic droplet generation device includes,
a droplet generation zone;
the dispersed phase input channel coupled to the droplet generation zone at a first junction;
an output channel coupled to the droplet generation zone at a second junction;
a first and a second break channel intersecting the dispersed phase input channel at the first junction;
a first and a second bypass channel intersecting the output channel at the second junction;
the first continuous phase input channel is coupled to the first bypass channel;
the second continuous phase input channel is coupled to the second bypass channel;
a first connecting channel connected with a first end to the droplet generation zone and with a second end to the first bypass channel; and
a second connecting channel connected with a first end to the droplet generation zone and with a second end to the second bypass channel.

15. The method of claim 14, wherein one or both of the continuous phase flow rate and the dispersed phase flow rate are about 1 µL/min to 80 µL/min per droplet generation device.

16. The method of claim 14, wherein the continuous phase liquid is a hydrophobic liquid.

17. The method of claim 14, wherein the continuous phase liquid comprises an oil selected from the group consisting of silicon oil, mineral oil, and other water immiscible oils.

18. The method of claim 14, wherein the continuous phase liquid comprises a surfactant.

19. The method of claim 14, wherein the dispersed-phase liquid is a hydrophilic liquid such as water.

20. The method of claim 14, wherein the hydrophobic liquid further comprises a salt, small molecule, biomolecule, polymer, nano-crystal, or nanoparticle dissolved or suspended in the hydrophobic liquid.

* * * * *